Patented Oct. 28, 1941

2,260,543

UNITED STATES PATENT OFFICE 2,260,543

METHOD FOR COLORING PLASTIC RESINS

Carleton N. Smith, Rocky River, Ohio, assignor to Carbide and Carbon Chemicals Corporation, a corporation of New York No Drawing. Application May 22, 1937, Serial No. 144,311

6 Claims. (Cl. 8—4)

This invention is an improved process for coloring articles made from thermoplastic materials, and it broadly comprises a simple and novel method for obtaining uniformity and durability of color, and unusually close matching of shades without impairing the surface of the articles.

A finished article may be colored either by coating it with an adhesive material containing the desired color, such as a paint or lacquer, or it may be dyed or stained by immersion in solutions of dyes whereby the dye is deposited in the material of the article. The latter method has the advantage that the transparency or translucency of the object and its surface finish always subsists after coloring, and that there is no film or layer present which might peel or chip off with wear. However, the immediate obstacle to dyeing by immersion articles which are made from thermoplastic materials lies in the fact that these materials are either substantially impervious to the ordinary dye solutions, or unduly attacked by them. In the former case the coloring is extremely light, and, even after days of immersion, can be removed wholly or in part by polishing, while scratches disclose the uncolored material beneath the surface. On the other hand, if dye solutions are used which attack or dissolve the thermoplastic material, the article becomes badly streaked with color and its surface so damaged that the value of the article is often destroyed.

This invention provides a method of dyeing articles made from thermoplastic materials whereby a uniform color is imparted thereto without causing deterioration of the dye-impregnated surface. The articles may be dyed without the aid of heat or pressure in materially less time than has been done heretofore, and the color will withstand the effects of wear and abrasion. Nearly all thermoplastic materials, even when they contain other substances as fillers, may be colored in the manner to be described without any appreciable change in the surface finish or lustre, and in any event they may easily be given the desired surface appearance by only a relatively small amount of polishing. Also, the articles may be handled shortly after treatment without marking or damaging the finish.

The process of this invention consists in immersing the article in a dye solution which exerts a controlled and limited solvent action on the resin. That is, the solvent characteristics of the dye solution must be controlled within that part of the range between solvent and nonsolvent which permits the resin surface to be penetrated, but not appreciably dissolved. In other words, for the dye to be deposited in the surface of the article, the dye solution must have enough solvent action to penetrate the surface, but, on the other hand, it must also have sufficient nonsolvent properties so that it will not appreciably dissolve the surface and thus ruin the finish of the article, or, in extreme cases destroy the article itself.

The preparation of dye solutions having the above characteristics consists either in selecting a solvent for the resin and adding to it enough of a miscible nonsolvent to bring the resulting solvent properties of the mixture within the desired range, or by choosing a single fluid which itself exerts a limited solvent action, either as a partial solvent or as a nonsolvent swelling agent. If solvent and nonsolvent liquids are used in admixture, they need be miscible only in the proportions employed. The mixture selected, must, of course, be a solvent for the dye. Similarly, mixtures of various partial solvents, with or without solvents or nonsolvents, may advantageously be employed. If water is chosen as the nonsolvent for a particular resin, it is often advantageous to dissolve in it a solid substance, such as a salt, which is substantially insoluble in the solvent. The effect of the dissolved solid is to increase the penetration rate of the solvent.

Although it is not absolutely essential, it has been found desirable in most cases to rinse the dyed article immediately upon removal from the dye bath. Usually the rinse is composed of the same liquid as the nonsolvent component of the dye bath, or a mixture of solvent and nonsolvent which has less solvent action on the material than the dye solution. This rinse removes the excess dye and any dissolved resin which may be on the surface of the dyed article, and prevents color streaking and surface "fogging." Best results are obtained if a rinse is used which has a slightly lower solvent power for the resin than the dye solution. If there is too great a difference between the solvent power of the rinse and dye baths, dissolved resin on the surface of the article may be precipitated, and the resultant whitening or "fogging" will detract from both the color and lustre of the surface.

The shade of color of the dyed article depends upon several variables. For example, the dye concentration, solvent power of the bath, temperature, immersion period, and composition of the rinse and immersion period therein (if a solvent and nonsolvent mixture is employed as a rinse) will influence directly the results obtained. An additional factor which will to some extent determine the choice of solvents and nonsolvents is the range of macromolecular weights of the polymers composing the resin, due to the fact that the solubility of the polymers decreases as the molecular weight increases. This is especially true of the vinyl resins. For example, toluene will dissolve the lower polymers of the vinyl ester resins, but will affect the high polymers only to the extent of causing a limited degree of swelling. Acetone will dissolve the resin completely, while methanol will not dissolve any of it. However, acetone and methanol may be mixed in varying proportions to obtain any degree of solvent power desired. To illustrate more clearly the scope of this invention and the applicability of this process to the coloring of different thermoplastic materials, the following examples are given:

*Example I*

In this example, the articles colored were rods approximately 6 inches long, and 0.5 inch wide and 0.2 inch thick molded from a resin made by the conjoint polymerization of vinyl chloride with vinyl acetate, and containing between 75% and 95% vinyl chloride. As prepared, this resin consisted of a mixture of polymers whose molecular weights varied from 1000 to 19,000 with a large proportion falling between 6000 and 15,000. (Molecular weights referred to herein are calculated by means of Staudinger's formula from determinations of the viscosity of solutions of the material.)

Different specimens of the rods were given the following treatments at room temperature:

(A) A five minute immersion in a mixture of 20 volumes of ethylene dichloride and 80 volumes of isopropyl ether in which was dissolved about 0.3% by weight of Newport oil brown dye. Following this period of immersion, the rods were rinsed for three seconds in isopropyl ether.

(B) A two minute immersion in a mixture of 30 volumes of ethylene dichloride and 70 volumes of gasoline in which was dissolved about 0.2% by weight of oil red dye. Following this, the rods were rinsed for three seconds in gasoline.

(C) An 8.5 second immersion in a mixture of 70 volumes of acetone and 30 volumes of methanol in which was dissolved about 0.125% by weight of DuPont oil red dye. The rods were rinsed immediately afterwards in a mixture of 50 volumes of acetone and 50 volumes of methanol.

The treatments A and B, above, are especially suited to dyeing vinyl ester resins where quality and mechanical strength of the formed resin articles are of particular importance, but the use of acetone-methanol mixtures as illustrated in treatment C is generally satisfactory where great mechanical strength is not essential. Mixtures of acetone and methanol containing from 10% to 70% acetone may be used for dyeing at room temperatures (20° to 25° C.), but the preferred range is from 50% to about 65% acetone. More than 70% acetone by volume will cause a definite dulling of the surface, while less than 50% produces light colors due to the reduced penetration of the dye solution. Other solvent mixtures may be used in place of acetone and methanol. However, the solvent and nonsolvent ratios must be similarly adjusted, depending upon the solvent powers of the liquids selected. For example, a mixture of 95% acetone and 5% water, or of 40% acetone and 60% isopropanol or ethanol will give results comparable to the mixture of equal volumes of acetone and methanol.

The liquid of the dye bath need not be limited to a two component system. Three and four component mixtures of solvents and nonsolvents may be used, such as the following:

(1) Methyl ethyl ketone - methanol - isopropyl ether
(2) Acetone-methyl acetate-isopropanol
(3) Dioxan-ethyl acetate-ethanol-carbon tetrachloride.

The use of a rinse solution following the dyeing operation may or may not be necessary, again depending upon the solvent and nonsolvent ratio of the dye bath. For example, a dye bath formed of 60% acetone and 40% methanol by volume will produce deep colors in a few seconds immersion, but some resin will be dissolved. Unless a rinse of lower solvent power for the resin is used immediately following the dyeing, the surface lustre of the article will be destroyed. On the other hand, a dye bath formed of 30% acetone and 70% methanol by volume will produce lighter shades of colors with a few minutes immersion and very little of the resin will be dissolved. In this case the surface lustre will not be affected and the rinse can be entirely replaced by merely wiping off the surface of the dyed article with a dry cloth. When a rinse composed of a solvent-nonsolvent mixture is used, the time of immersion must be carefully regulated in order to obtain very close matching of shades. This is because the rinse will remove some color from the dyed article. If the color desired is not extremely dark, a dye bath composition which is low in solvent is preferred because it permits the use of a rinse composed of the pure nonsolvent, and the period of immersion in the rinse has no effect on the color of the dyed article. In general, a rinse from 3 to 5 seconds is sufficient to maintain the surface lustre of the article.

Certain of the dye bath solvents evaporate so rapidly that slight streaking may occur during the interval of transfer of the dyed article from the bath to the rinse, particularly if high concentrations of dye are used. A pronounced streaking invariably occurs when isopropyl ether or certain highly volatile liquids are used as the nonsolvent components of the baths unless a very rapid transfer is made. This trouble may be avoided by the addition of about 4% of a nonsolvent having a high boiling point (such as a light mineral oil) to the dye bath.

The effect of the nonsolvent in the dye solution may be changed greatly by the addition of different salts. This will permit increased dyeing rate, or, for a fixed period of immersion, increased color intensity of the dyed article. In the case of acetone and water dye baths, the addition of sodium chloride was found to be very effective, and sodium acetate, calcium chloride, and triethanolamine hydrochloride somewhat less so. The salt apparently causes a faster penetration of the dye solution into the resin with the result that deeper shades of color are obtained in the same way as may be accomplished with higher ratios of acetone in the absence of the salt.

In all of the treatments shown in the above example, the solvent strength of the dye bath was controlled by the ratio of solvent to nonsolvent. A definite ratio could not be exceeded for each pair of liquids without destroying the surface lustre of the dyed article. However, there are several single liquids which may be termed partial solvents, and which behave similarly to mixtures of solvents and nonsolvents. As in the case with the solvent and nonsolvent mixtures, the solubility in these partial solvents of the vinyl ester resin used in this example is limited to the lower polymers, and these liquids may be used as dye baths without the addition of a nonsolvent. Three such partial solvents are benzene, toluene and trichlorethylene. Deep colors were obtained with 1 minute immersions. Although a rinse is not absolutely necessary, the dyed surfaces are better suited for immediate handling if the dyeing is followed by a rinse of several seconds in a nonsolvent, such as gasoline. In general, isopropanol, isopropyl ether, and naphtha are especially suited as the nonsolvent components of dye baths and rinse solutions for dyeing polyvinyl ester resins.

It has also been found that vinyl resins can be dyed from baths of certain nonsolvent swelling agents, such as diethyl ether, carbon disulfide, isopropyl ether, and carbon tetrachloride. Deep colors were obtained within several hours when the first two were used, while one to four days were required with the last two liquids. Other nonsolvents, such as the lower alcohols and gasoline, produce only very light uneven stains on the surface of the resin.

The following further examples will additionally illustrate the invention:

Example II

In this example, different sheets, approximately 3 inches long, 1.5 inches wide and 0.125 inch thick, made of polymerized vinyl acetate were given the following treatments at room temperature:

(A) A three minute immersion in a mixture of 20 volumes of acetone and 80 volumes of isopropyl ether, containing about 0.2% by weight of fat blue Z dye. Following this period of immersion, the samples were rinsed in isopropyl ether.

(B) A five minute immersion in a mixture of 3 volumes of acetone and 97 volumes of petroleum ether containing about 0.2% by weight of fat blue Z dye. This immersion was followed by a rinse in petroleum ether.

Example III

Different sheets of polymerized vinyl chloride, of the same size as in Example II, were treated as follows at room temperature:

(A) A five minute immersion in a mixture of 50 volumes of acetone and 50 volumes of isopropyl ether, containing about 0.3% by weight of fat blue Z dye, and followed by a rinse in isopropyl ether.

(B) A 24 hour immersion in a mixture of 20 volumes of acetone, 40 volumes of isopropyl ether, and 40 volumes of carbon tetrachloride, containing about 0.3% by weight of oil red dye and followed by a rinse in carbon tetrachloride.

Example IV

This resin was a partial polyvinyl acetal in which the polyvinyl alcohol had been acetalized to about 66% with butyraldehyde. Different sheets approximately 4 inches long, 2 inches wide and 0.010 inch thick were treated in the following mixtures at room temperature:

(A) A one to five minute immersion in a mixture of 10 volumes of monoethyl ether of ethylene glycol and 90 volumes of gasoline, containing about 0.15% by weight of oil red dye. The samples were subsequently rinsed in gasoline.

(B) An immersion from 15 seconds to 10 minutes in a mixture of 10 volumes of methanol and 90 volumes of isopropyl ether, containing about 0.2% by weight of fat blue Z dye, followed by a rinse in isopropyl ether.

(C) Other samples of this resin have been colored by immersion in nonsolvent swelling agents, containing a dissolved dye, without any subsequent rinsing. Very satisfactory results have been obtained by employing a 15 second immersion in acetone, or a 30 second immersion in carbon disulfide, or a 5 minute immersion in benzene.

In addition to dyeing the various vinyl resins given in the foregoing examples, many tests have been conducted in coloring other thermoplastic materials, and the following examples are typical of the results obtained:

Example V

Sheets of cellulose acetate of the same size as in Example IV were given the following treatments at room temperature:

(A) An immersion of 1 to 5 minutes in a mixture of 50 volumes of methyl ethyl ketone and 50 volumes of isopropyl ether, containing about 0.35% by weight of oil red dye, followed by a rinse in isopropyl ether.

(B) A three minute immersion in a mixture of 20 volumes of acetone and 80 volumes of petroleum ether containing about 0.3% by weight of fat blue Z dye, followed by a rinse in petroleum ether.

(C) A one minute immersion in a mixture of 40 volumes of acetone and 60 volumes of water, containing about 0.3% of Zapon blue dye, followed by a clear water rinse.

Example VI

A sheet of Celluloid of the same size as in Example IV, was immersed for three minutes at room temperature in a mixture of 20 volumes of acetone and 80 volumes of gasoline, containing about 0.2% by weight of fat blue Z dye. Following the immersion, the sheet was rinsed in gasoline.

Example VII

Sheets of a polystyrene resin, of the same size as in Example II, were given different shades of red, at room temperature, by varying the period of immersion from 1 to 3 minutes in a mixture of 20 volumes of toluene and 80 volumes of isopropanol, containing about 0.2% by weight of oil red dye. The resin was subsequently rinsed in isopropanol.

Example VIII

Of the various resins tested in this process the methyl methacrylate resin proved to be the most difficult to dye. It was found that a dye bath composed of 50 volumes of acetone and 50 volumes of water, saturated with sodium chloride and containing about 0.2% by weight of Zapon blue dye would give sheets of the resin, of the same size as in Example II, a light color in about 20 minutes at room temperature. However, the surface required buffing to restore its original lustre.

Example IX

A film 0.0015 inch thick, composed of a rubber derivative commercially known as "Pliofilm," was cut into samples 4 inches long by 2 inches wide. The samples were given three minute immersions at room temperature in a mixture of 20 volumes of acetone and 80 volumes of isopropyl ether, containing about 0.2% by weight of fat blue Z dye, and rinsed in isopropyl ether afterward. Since no real solvent has been found for this plastic, either of the above two components of the dye bath may be used alone. Also, benzene and methyl acetate may be used individually or in admixture to obtain satisfactory colors. Isopropyl ether has a much smaller swelling action than acetone and the combination of the two is given simply to illustrate a suitable example of mixed liquids.

*Example X*

Samples 4 inches long by 2 inches wide, cut from a cast film 0.005 inch thick of an isobutylene polymer commercially known as "Vistanex," was found to dye fairly well at room temperature by a 2 minute immersion in a mixture of 80 volumes of toluene and 20 volumes of acetone, containing about 0.1% by weight of oil red dye. After immersion in the dye bath, the resin was rinsed in a mixture of 40 volumes of toluene and 60 volumes of acetone.

Naphtha, gasoline, and petroleum ether behave similarly in the dye baths and may be used interchangeably. As a group, they may be referred to as petroleum distillate fractions boiling between approximately 40° and 200° C.

Single dyes or a combination of different dyes may be used to give variety of shades and colors to the articles treated. The dyes must of course be soluble in the liquid employed to impregnate the plastic surface. Spirit-soluble dyes are most suitable for use in acetone and alcohol mixtures although certain water-soluble and oil-soluble dyes also may be used. Oil-soluble dyes are, in general, best for use with chlorinated hydrocarbons and aromatic solvents. However, the specific solubility characteristics will vary with the individual dyestuff, and the dye and solvent choice will be determined by the specific properties of the various materials.

Several factors affect the intensity of color applied to the article by this immersion method. The dye concentration obviously will control this over a wide range, the limiting value being the dye solubility in the liquid employed. The time of immersion regulates both color and intensity, and depth of dye penetration. For example, 0.08% by weight of Victoria blue dye in a mixture of 70% acetone and 30% methanol will impart a light blue color to a vinyl ester resin to an approximate depth of 0.001 inch in 30 seconds immersion. A deep blue color and 0.019 inch penetration are obtained with 60 minutes immersion. Repeated immersion of short duration may be employed to obtain a deep color without increased penetration. Also, an increase in temperature imparts deeper shades, or conversely, shortens the period of immersion.

Since the resin selectively absorbs the solvent from a mixture of solvent and nonsolvent, in definite proportions apparently independently of the ratio of these employed, it is evident that long continued or repeated dyeing will deplete the dye bath of the solvent component, and some compensation, such as addition of dye and solvent or increased dyeing time, must be employed if identical shades of color are to be obtained.

The dyed articles may be handled immediately upon removal from the dye bath if the latter has a low solvent power for the resin. However, a bath of high solvent power will necessitate drying for a few minutes after the rinse because of the softened condition of the surface resin.

The foregoing description is given by way of illustration and many modifications of the process may be made within the scope of the invention as defined by the appended claims.

I claim:

1. Method of coloring articles made of thermoplastic material which comprises depositing a dye in the surface thereof by contacting the article with a dye in a solution comprising a mixture of solvent for the thermoplastic material and water, and a dissolved salt, in such proportions that the solution will penetrate the surface of the article without appreciably dissolving it, and rinsing the dyed article in a mixture of solvent and water which contains less solvent than the dye solution.

2. Method for coloring articles made from the product obtained by the conjoint polymerization of a vinyl halide and a vinyl ester of a lower aliphatic acid, which comprises depositing a dye in the resin surface by contacting the articles with a dye dissolved in a mixture of acetone and methanol, and rinsing the article in a liquid containing less acetone than the dye solution.

3. Method of coloring articles made from the conjoint polymer of vinyl chloride and vinyl acetate, containing between 75% and 95% of vinyl chloride which comprises contacting the articles with a dye dissolved in a mixture of acetone from 10% to 70% and methanol from 90% to 30%, and rinsing the articles in a mixture of methanol and acetone containing less acetone than the dye bath.

4. Method of permanently and uniformly coloring articles made of a thermoplastic artificial resin while preserving the surface luster of the article, which comprises briefly immersing the article in a dye solution maintained at a temperature below the softening point of the resin, said solution comprising a dyestuff and a mixture of a solvent and a miscible non-solvent for the artificial resin, and depositing the dye beneath the surface of the article without appreciable solution thereof, and thereafter rinsing the dyed article in a mixture of solvent and non-solvent which contains less solvent than the dye solution.

5. Method of permanently and uniformly coloring articles made from vinyl resins, while preserving the surface luster of the article, which comprises briefly immersing the article in a dye bath maintained at a temperature appreciably below the softening point of the resin, said dye bath comprising a dye dissolved in a mixture of ethylene dichloride and a miscible organic non-solvent for the resin, depositing the dye beneath the surface of the article without appreciable solution thereof, and thereafter rinsing the dyed article in a mixture of solvent and nonsolvent which contains less solvent than the dye bath.

6. Method of coloring articles made from conjoint polymers of vinyl halides and vinyl esters of lower aliphatic acids, while preserving the surface luster of the article, which comprises briefly immersing the article in a dye bath maintained at a temperature appreciably below the softening point of the resin, said dye bath comprising a dye dissolved in a mixture of ethylene dichloride and a petroleum fraction boiling between 40° and 200° C., depositing the dye beneath the surface of the article without appreciable solution thereof, and thereafter rinsing the dyed article in a mixture of solvent and nonsolvent which contains less solvent than the dye bath.

CARLETON N. SMITH.